(12) United States Patent
Finsterwalder et al.

(10) Patent No.: US 8,802,317 B2
(45) Date of Patent: Aug. 12, 2014

(54) OXIDATION-STABILISED POLYMER ELECTROLYTE MEMBRANE FOR FUEL CELLS

(75) Inventors: Florian Finsterwalder, Illerkirchberg (DE); Thomas Soczka-Guth, Schelklingen (DE); Manuel Christian Schaloske, Stuttgart (DE)

(73) Assignee: Daimler AG, Stuttgart (DE)

( * ) Notice: Subject to any disclaimer, the term of this patent is extended or adjusted under 35 U.S.C. 154(b) by 1138 days.

(21) Appl. No.: 12/438,736

(22) PCT Filed: Aug. 21, 2007

(86) PCT No.: PCT/EP2007/007348
§ 371 (c)(1),
(2), (4) Date: Feb. 25, 2009

(87) PCT Pub. No.: WO2008/025465
PCT Pub. Date: Mar. 6, 2008

(65) Prior Publication Data
US 2010/0003570 A1 Jan. 7, 2010

(30) Foreign Application Priority Data
Aug. 31, 2006 (DE) .......... 10 2006 040 749

(51) Int. Cl.
*H01M 8/10* (2006.01)

(52) U.S. Cl.
USPC ......... 429/492; 429/231.6; 429/141; 429/145

(58) Field of Classification Search
USPC .................................. 429/30, 33
See application file for complete search history.

(56) References Cited

U.S. PATENT DOCUMENTS

| | | | |
|---|---|---|---|
| 6,723,757 B1 | 4/2004 | Kerres et al. | |
| 2004/0127588 A1 | 7/2004 | Calumdann et al. | |
| 2005/0136308 A1* | 6/2005 | Andrews et al. | 429/30 |
| 2006/0035095 A1 | 2/2006 | Calundann et al. | |
| 2006/0105215 A1* | 5/2006 | Panambur et al. | 429/30 |
| 2007/0048605 A1* | 3/2007 | Pez et al. | 429/199 |
| 2007/0248863 A1* | 10/2007 | Pawlik et al. | 429/30 |
| 2011/0097642 A1 | 4/2011 | Miyake et al. | |

FOREIGN PATENT DOCUMENTS

| | | | |
|---|---|---|---|
| DE | 19817374 A1 | | 10/1999 |
| DE | EP1624512 | * | 2/2006 |
| JP | 2004134294 A | | 4/2004 |
| JP | 2005520001 A | | 7/2005 |
| JP | 200553659 A | | 12/2005 |
| WO | 2004030135 A2 | | 4/2004 |
| WO | 2005000949 A1 | | 1/2005 |
| WO | 2006034014 A1 | | 3/2006 |
| WO | WO2006/034014 | * | 3/2006 |

OTHER PUBLICATIONS

Wycisk et al. "Direct Methanol Fuel Cell Membranes From Nafion-Polybenzimidazole Blends" Journal of Power Sources, vol. 163, No. 1, Dec. 7, 2006, pp. 9-17.

* cited by examiner

*Primary Examiner* — Melvin C Mayes
*Assistant Examiner* — Colette Nguyen
(74) *Attorney, Agent, or Firm* — Patent Central LLC; Stephan A. Pendorf

(57) ABSTRACT

Polymer electrolyte membrane (PEM) made from perfluorosulfonic acid polymers, displaying proton conductivity at least in the presence of water, adequate for operation in a fuel cell, comprising at least one oxidation protection agent and additives. The PEM is an acid/base polymer blend which forms acidic and basic domains, the basic polymer being formed by polybenzimidazole (PBI) and the at least one oxidation protection agent being formed by manganese oxide.

15 Claims, 1 Drawing Sheet

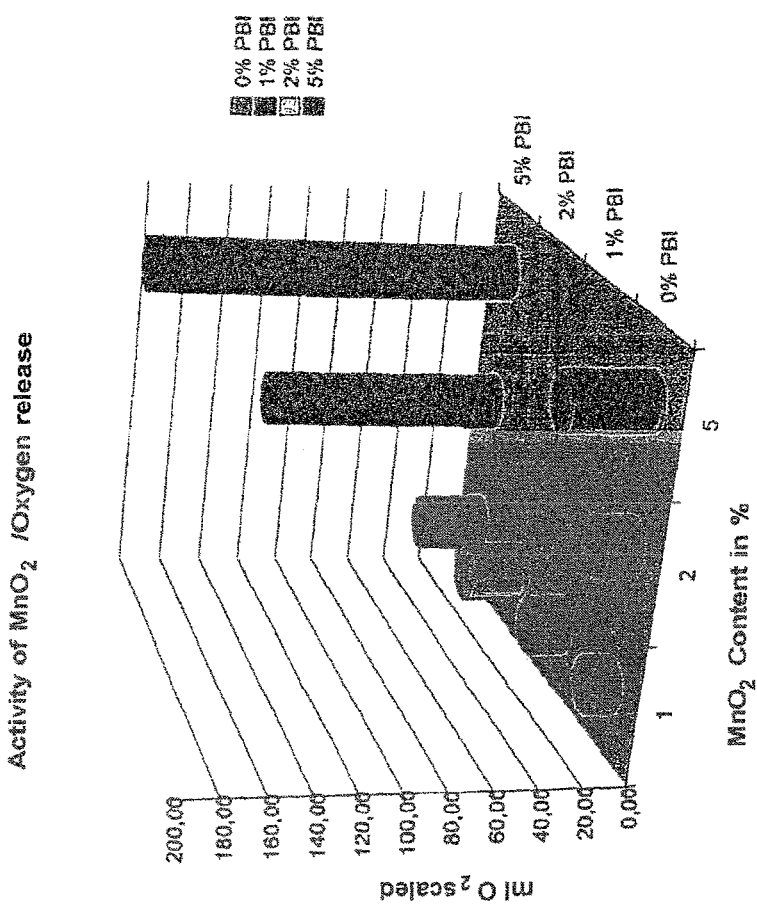

OXIDATION-STABILISED POLYMER ELECTROLYTE MEMBRANE FOR FUEL CELLS

The invention relates to polymer electrolyte membranes (PEM), in particular for hydrogen-driven low temperature fuel cells in motor vehicles, where the PEM comprises a sufficient proton conductivity at least in the presence of water, which is sufficient for the operation in a fuel cell.

A typical polymer electrode membrane fuel cell (PEMFC) comprises a membrane electrode arrangement (MEA) constructed of an anode, a cathode, and a polymer electrode membrane (PEM) arranged therebetween. The MEA is on its part again arranged between two separator plates, where one separator plate comprises channels for the distribution of fuel, and the other separator plate channels for the distribution of oxidation agents. The anode and cathode are generally formed as gas diffusion electrodes (GDE), which have the object to divert the current generated in the electrochemical reaction (in particular $2H_2+O_2 \rightarrow 2 H_2O$) and to ensure diffusion of the educts and products from and to the catalyst layer.

A PEM is constructed from different components. The most important component is a proton-conducting ionomer, often as copolymer or polymer blend. In addition to the ionomers additives with different functions are contained therein. Organic and/or inorganic reinforcing fibers, in particular PTFE fibers or glass fibers are used as reinforcing additives. They are often present as fabrics or knitted fabrics. Further additives are metal oxide particles, in particular silica gel ($SiO_2$), which for example takes on a supporting role for keeping the humidity level of the PEM. Furthermore, other additives can be contained, which modify the conductivity behavior of the base ionomer, as e.g. phosphoric acids or low molecular amphoterics such as imidazole and/or pyrazole.

Among the ionomers are amongst others basic polymers in combination with highly acidic polymers. Examples of these basic polymers are poly(benzimidazoles) (PBI), poly(imides) (PI), poly(etherimides) (PEI), poly(acrylamides), poly(oxadiazoles) (POD). Examples of acidic polymers are polyvinylphosphonic acids or polyvinylsulfonic acids. Such ionomers for the use as PEM are for example described in DE 102 20 818 A1, DE 198 17 374 or WO 01/18894 A1. These acid/base ionomers are characterized in that the proton conductivity can usually take place without water and that an operation at temperatures above the boiling point of water is possible.

From DE 198 17 3474 A1 are known mixtures of sulfonated aryl polymer (PEEK and PSU) and polybenzimidazole (PBI), which have a covalent crosslinking by means of the proton transfer of sulfonated aryl polymer to PBI (e.g. PEEK-$SO_2$—O—H—N-PBI). This crosslinking already takes place at room temperature in the solvent, for example N-methyl pyrrolidone (NMP), whereby an insoluble polyelectrolyte is formed. The interaction between PBI and aryl polymer has such a strength that high inhomogeneities can be caused in the membrane between the crosslinking region, the gel phase expanded by water and the polymer matrix. Consequently, interior tensions can result in the membrane, which can lead to a deterioration of the mechanical stability of the membrane.

Particularly suitable acidic proton-conducting ionomers for the production of PEM are e.g. homogeneous perfluorated polymers as e.g. Nafion (DuPont), Dow membranes (Dow), Flemion (Asahi Glass) and Aciplex (Asahi Kasei). These polymers have a perfluoroalkyl main chain with perfluoroalkylether side chains, at the end of which is a sulfonic acid group (partially also a carboxylic acid group). These itemized ionomers are in summary called perfluorosulfonic acid polymers in the following.

Nafion® (registered trademark by DuPont) is an example for the structure. It is a sulfonated tetrafluoroethylene polymer (PTFE) or perfluorosulfonic acid polymer. The production is for example known from U.S. Pat. No. 3,692,569.

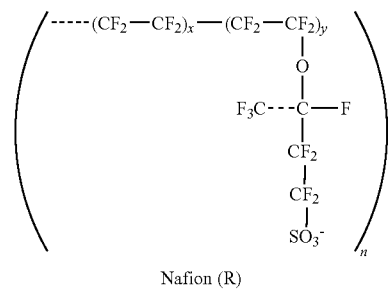

Nafion (R)

Perfluorated ionomer membranes are characterized by especially high chemical and thermal stability, high water permeability and cation selectivity.

With the polymer electrolyte fuel cell, highly reactive hydroxyl radicals or $H_2O_2$ are formed, which form the primary cause for the degradation of the membrane and which damage this in an irreversible oxidative manner. Gas leakages of the PEM result from the hole formation connected therewith, which promotes a direct reaction of hydrogen and air, and thus leads to bypasses and the failure of the cell. As the formation of $H_2O_2$ and its radicals cannot be avoided in its origin, a solution for its destruction has to be found.

One solution to increase the stability of the PEM is catalytic decomposition of the peroxides or peroxide radicals already formed. The use of peroxide-decomposing additives is known in principle. DE 101 30 828 A1 thus describes a fuel cell with two electrodes and an ion exchange membrane, where the fuel cell comprises at least one additive which inhibits the formation of peroxides and/or decomposes peroxides. The additive preferably contains one of the elements Co, Fe, Cr, Mn, Cu, V, Ru, Pd, Ni, Mo, Sn or W contained in elemental form or in the form of salts, oxides or organometallic complexes. In WO 2006 034 014 A1 are described polymer membrane electrodes for fuel cells which comprise highly fluorinated polymer electrolytes with additives of manganese oxide. $MnO_2$ or $Mn_2O_3$ are preferably used as manganese oxide.

$MnO_2$ is seen as a catalytically active anent. The reaction formula of the peroxide decomposition catalysed by $MnO_2$ can be summarized as follows:

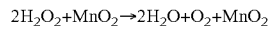

The decomposition presumably proceeds via a redox cycle between Mn(II) and Mn(IV) with Mn(OH)$_2$ as intermediate product.

The embedding and long-term stability of pyrolusite ($MnO_2$) in acidic, in particular in perfluorosulfonic acid polymers is however problematic. Analogously to the tendency that low oxidation numbers are preferred in an acidic environment, but high oxidation numbers in a basic environment, Mn(IV) oxide proves to be unstable under the acidic operating conditions of PEMFC. It is in fact reduced to Mn(II), whereby it loses its catalytic $H_2O_2$ decomposing effect. The Mn(II) compounds are additionally water-soluble and are washed out from the PEM over time.

The known systems with peroxide-decomposing additives on the basis of manganese oxide have thus the great disadvantage that the active $MnO_2$ is not stable in the acidic environment of the cation exchange membrane. Such additives thus only show a low activity with regard to the $H_2O_2$ decomposition and a low long-term stability in the membrane.

It is thus the object of the invention to provide a PEM on the basis of perfluorosulfonic acid polymers which comprises an improved stability with regard to the oxidative decomposition.

According to the invention, the object is solved by a PEM on the basis of perfluorosulfonic acid polymers which comprises a proton conductivity at least in the presence of water, which is sufficient for the operation in a fuel cell, comprising and acid/base polymer blend which forms acidic and basic domains, at least one oxidation protection agent and additives, where the basic polymer is formed by polybenzimidazole (PBI), and the at least one oxidation protection agent by manganese oxide.

The object is further solved by a method for the production of a PEM on the basis of perfluorosulfonic acid polymers with acid/base polymer blends and the oxidation protection agent manganese oxide.

According to the invention, it is thus provided that basic domains are also formed in the PEM on the basis of a perfluorosulfonic acid polymer in addition to the acidic regions. This takes place by the addition of the basic polymer polybenzimidazole (PBI). The basic and acidic polymers combined according to the invention result in a distinctive domain structure of the polymer blend due to their rigid structural polymeric construction. The ratio of perfluorosulfonic acid and PBI is thereby adjusted in such a manner that the perfluorosulfonic acid polymer forms a matrix phase and adopts the proton conduction. The PBI behaves as a disperse phase. The oxidation protection agent manganese oxide comes across basic domains formed by PBI in the polymer blend according to the invention, where a very stable chemical environment prevails for Mn(IV). The formation of catalytically active $MnO_2$ is greatly favored hereby. The present $MnO_2$ is also largely protected against the effect of the acidic perfluorosulfonic acid polymer by the size of the domains.

This is stabilized by the embedding of the additive $MnO_2$ in a basic matrix and its $H_2O_2$ decomposition activity is considerably increased. By the use of the perfluorosulfonic acid polymer membrane doped according to the invention, the long-term stability, the life cycle and thus the efficiency of a polymer electrolyte membrane fuel cell is increased considerably.

As the stability and the activity of the manganese oxide contained in the PEM is increased, comparatively less manganese oxide can be used. This is also an advantage for the long-term stability of the PEM.

The added PBI has, in addition to the stabilization of the peroxide-decomposing catalyst also the advantage that it leads to a mechanical solidification of the PEM. This has to be attributed to the rigid ionic bonding in the acid/base polymer blend.

The addition of the PBI additionally results in a stiffening of the polymer chain due to the ionic bonding to the sulfonic acid groups, which inhibits the mechanism of the radical chain decomposition, which leads to a particularly strong damage of the PEM.

As the PBI partially results in a neutralization of the perfluorosulfonic acid polymer, it reduces the proton conductivity, so that an optimum has to be found with regard to the stabilization of the manganese oxide and the proton conductivity. The ratio of polybenzimidazole (PBI) to perfluorosulfonic acid polymer in weight % is preferably in the range from 0.01 to 0.4. A ratio of 0.02 to 0.06 is chosen in a particularly preferred manner. In the presence of 1 to 5 weight % $MnO_2$, the ratio is especially preferred at 0.003 to 0.04.

Even though $MnO_2$ is seen as the catalytically active species, it is not compulsory that the manganese oxide is only present as $MnO_2$ (pyrolusite) in the PEM. $MnO_2O_3$ can for example be mobilized under the acidic conditions and then be bonded in the basic domains as $MnO_2$. The manganese oxide in the PEM is preferably essentially formed by $MnO_2$.

The perfluorated polymers such as Nafion, Dow membranes, Flemion and/or Aciplex can be used as proton-conducting acidic ionomers.

A preferred composition of the polymer electrolyte membrane comprises the following parts:
PBI: 0.5-8 weight %
manganese oxide: 0.1 to 15 weight %,
additives: 0.1 to 15 weight %
and the remainder perfluorosulfonic acid polymer, in particular Nafion®.

Nafion® is particularly preferably used as perfluorosulfonic acid polymer. The mobility of the Nafion chains is reduced in such a manner by the acid/base crosslinking of Nafion and PBI, that particularly radical chain degradation mechanisms are considerably delayed. This is a further advantage of the addition of PBI.

A Nafion with an equivalent weight in the region of 800 to 1900 is preferred, in particular 1000 to 1100 g/mol (—$SO_3H$).

A further preferred composition is:
PBI: 2-8 weight %,
manganese oxide: 0.3 to 5 weight %,
additives: 1 to 10 weight %,
and the remainder Nafion®.

A particularly preferred composition of the polymer electrolyte membrane comprises the following parts:
PBI: 2.5 to 5 weight %,
$MnO_2$ 2.5 to 5 weight %,
additives: 1 to 10 weight %,
and the remainder Nafion®.

The given compositions relate to the PEM in the dried, or solvent- and water-free state.

The PEM according to the invention is not a membrane which comprises a proton conductivity without the presence of water suitable for fuel cell applications. The PEM correspondingly has to be moistened during the operation. Preferably, a water content is adjusted which is about 2-10 mol water/mol sulfonic acid groups.

In addition to the manganese oxide, further oxidation protection agents can also be present, which act as peroxide-decomposing catalysts. Among these are particularly oxides chosen from the group Mo—, W—, Ni—, Co and/or Ti oxide.

In particular, reinforcing means such as glass fibers, PTFE fibers or aramid fibers, fillers and/or moisture regulators such as silica or silica gel are to be mentioned as further additives.

Lithium salts in an amount of 0.1 to 1 weight % can also be contained as a further additive.

It can be advantageous to modify the acidity and the mechanical properties by means of further acidic ionomers. For this, particularly polysulfonic acids and/or polyphosphonic acids in an amount of 0.1 to 5 weight % are added to the PEM as additives. Furthermore, further additives can be contained which modify the conductivity behavior of the basic ionomer, in particular low molecular amphoterics, such as imidazole and/or pyrazole.

A further aspect of the invention relates to a preferred production method for chemically stabilized polymer electrolyte membranes for fuel cells.

The method for the production of polymer electrolyte membranes of oxidation-stabilized acid/base polymer blends according to the invention comprises the following method steps:

mixing a weak ammoniac Nafion solution with an aqueous solution of $KMnO_4$ and/or salts or organometallic Mn(II, III, IV) compounds, addition of a PBI solution, outputting the solution and spreading it onto a cold substrate, drying to a layer having a thickness of 2 to 200 μm.

The integration of the manganese into the membrane can particularly take place in the form of Mn(II) salt as sulfate or chloride, as acetylacetonate, as Mn(VII) over $MnO_4$-oder directly als $MnO_2$. While the basic conditions present in the forming layer are sufficient for the conversion of Mn(II) in pyrolusite, the permanganate is mainly only reduced to pyrolusite during the membrane production by the high temperatures of the coating path. Acetylacetonates, acetates and/or polysulfonates can be used as organometallic Mn(IV) compounds. The Nafion solution contains polysulfonic acids and/or polyphosphonic acids in an amount of 0.1 to 5 weight % as additives. Sulfonated PEEK and PSU are important with the polysulfonic or polyphosphonic acids.

The PEM which can be obtained according to the method are particularly suitable for hydrogen-driven low temperature fuel cells in motor vehicles.

EXAMPLE 1

Production of Acid/Base Blends on the Basis of Nafion® and PBI 5.58 g of a 19.7% Nafion-DMAc solution are adjusted with half-concentrated ammonia in a weak basic manner and are subsequently spiked with 0.5 ml of $KMnO_4$ solution. After the complete homogenization of the aqueous and organic phase by stirring, 1.16 ml of a 5% PBI-DMAc solution is added and also homogenized. The solution is subsequently brought onto a cold glass plate, spread with a coating knife and heated at 130-140° C. for 25 min. The membrane having a thinness of 25 μm can be separated smoothly with deionized water after cooling.

According to this method, further compositions with different PBI and manganese contents were produced and were examined with regard to the catalytic effect of the peroxide decomposition and the long-term stability.

The weight loss which can be suffered by a membrane by the influence of hydrogen peroxide can be consulted as a direct measure of the oxidative damage or the long-term stability of PEM. The weight loss was determined with the aid of an apparatus which sprays the membrane for 24 hours with a 3% $H_2O_2$ solution. The sample chamber was heated to over 100° C., so that the hydrogen peroxide solution reached the membrane in a gaseous manner.

While an undoped membrane exhibited a weight loss of 6%, this was reduced to 3.8% with a blend membrane having 5 weight % PBI. If the membrane also contained 2 EW % $MnO_2$ in addition to this PBI, the weight loss was only 1.50%, with 5 EW % $MnO_2$, it was only a weight loss of 0.26%.

Activity tests of the catalytic effect of the peroxide decomposition at differently doped membranes could also confirm the stabilization of the pyrolusite by the partially basic environment of the PBI.

The measurement results for $MnO_2$ contents of 1, 2 or 5 weight % and PBI contents of 0, 1, 2 and 5 weight % are graphically shown in FIG. 1. They clearly show the influence of the manganese or the PBI content on the amount of nascent $O_2$ during the influence of 30% $H_2O_2$ on the membrane samples.

A further examination should show the stability of the incorporated pyrolusite with regard to the influence of acid. For this, membrane samples having the same size were placed into sulfonic acid of 0.5M, and the concentration of manganese ions in the acid was subsequently determined. The divalent manganese was oxidized to permanganate and subsequently determined photometrically in a quantitative manner. The concentration of the Mn ions in the solution thereby corresponded to the undoped membrane (0.47 mmol/l) more than double of the membrane doped with PBI and $MnO_2$ (0.19 mmol/l). This is an indication of an improved fixation of the $MnO_2$ within the membrane by the basic PBI matrix. In situ experiments of the membranes according to the invention were carried out at fuel cells compared to undoped Nafion membranes. They comprised diverse performance characteristics, impedance measurements, and primarily long-term degradation measurements. While the performance of a pure Nafion® membrane had dropped to 886 mV after 190 operating hours in an accelerated ageing test, a so-called OCV (open circuit voltage), a cell with 5% PBI part still possessed 884 mV after the same time, with additionally 5% $MnO_2$ even still 910 mV. The entire life cycle of this cell was about 1150 hours until a gas leak had formed. When the part of PBI was reduced to 2%, the life cycle increased again to about 1200 hours. This corresponded to approximately 12 times of the pure Nafion® membrane. Due to the resistance with regard to $H_2O_2$, the hole formation is delayed, so that the membrane stays gas-tight for a significantly longer time.

The invention claimed is:

1. A polymer electrolyte membrane (PEM) which exhibits a proton conductivity at least in the presence of water, the proton conductivity being sufficient for the operation in a fuel cell, comprising:
    at least one oxidation protection agent,
    additives, and
    a blend of an acid polymer and a base polymer which blend forms acidic and basic domains,
    wherein the basic polymer is polybenzimidazole (PBI), the acid polymer is perfluorosulfonic acid polymer and the at least one oxidation protection agent is manganese oxide,
    wherein the perfluorosulfonic acid polymer forms a proton conductive matrix phase,
    wherein manganese oxide is embedded in the basic domains formed by the polybenzimidazole,
wherein the membrane contains water in an amount of 1-10 mol water per mol sulfonic acid groups, and
    wherein polybenzimidazole (PBI) comprises 0.5 to 8 weight % of the PEM.

2. The polymer electrolyte membrane according to claim 1, wherein the acid polymer is a perfluorosulfonic acid polymer comprising a homogeneous perfluorated polymer having a perfluoroalkyl main chain with perfluoroalkylether side chains, at the end of which is a sulfonic acid group or carboxylic acid group and the manganese oxide is $MnO_2$.

3. The polymer electrolyte membrane according to claim 1, characterized by a composition of the following parts,
    PBI: 0.5-8 weight %,
    manganese oxide: 0.1 to 15 weight %,
    additives: 0.1 to 15 weight %
    and the remainder perfluorosulfonic acid polymer.

4. The polymer electrolyte membrane according to claim 1, wherein PBI is 1.5 to 4 weight % of the PEM.

5. The polymer electrolyte membrane according to claim 1, wherein the manganese oxide is about 0.5 to 2 weight % of the PEM.

6. A polymer electrolyte membrane according to claim 1, wherein further oxidation protection agents are present in addition to manganese oxide, chosen from the group consisting of Ni oxide, Co oxide and Ti oxide.

7. The polymer electrolyte membrane according to claim 1, wherein the additives are chosen from reinforcing agents, fillers and humidity regulators.

8. The polymer electrolyte membrane according to claim 1, wherein lithium salts are contained as additives in an amount of 0.1 to 1 weight %.

9. The polymer electrolyte membrane according to claim 1, wherein polysulfonic acids or polyphosphonic acids or both are contained as additives in an amount of 0.1 to 5 weight %.

10. A polymer electrolyte membrane (PEM) which exhibits a proton conductivity at least in the presence of water, the proton conductivity being sufficient for the operation in a fuel cell, comprising:
    at least one oxidation protection agent,
    additives, and
    a blend of an acid polymer and a base polymer which blend forms acidic and basic domains,
    wherein the basic polymer is polybenzimidazole (PBI), the acid polymer is perfluorosulfonic acid polymer,
    wherein polybenzimidazole (PBI) comprises 0.5 to 8 weight % of the PEM,
    wherein the at least one oxidation protection agent is manganese oxide, and
    wherein the ratio of $MnO_2$ to PBI is in the region of 0.1 to 1 in weight %.

11. The polymer electrolyte membrane according to claim 10, wherein the membrane contains water in an amount of 1-10 mol water per mol sulfonic acid groups.

12. The polymer electrolyte membrane according to claim 10, wherein the PBI is 1.5 to 4 weight % of the PEM.

13. A polymer electrolyte membrane (PEM) which exhibits a proton conductivity at least in the presence of water, the proton conductivity being sufficient for the operation in a fuel cell, comprising:
    at least one oxidation protection agent,
    additives, and
    a blend of an acid polymer and a base polymer which blend forms acidic and basic domains,
    wherein the basic polymer is polybenzimidazole (PBI), the acid polymer is perfluorosulfonic acid polymer and the at least one oxidation protection agent is manganese oxide,
    wherein polybenzimidazole (PBI) comprises 0.5 to 8 weight % of the PEM, and
    wherein the $MnO_2$ is primarily bound in the basic domains of the acid/base polymer blend.

14. The polymer electrolyte membrane according to claim 13, wherein the membrane contains water in an amount of 1-10 mol water per mol sulfonic acid groups.

15. The polymer electrolyte membrane according to claim 13, wherein the PBI is 1.5 to 4 weight % of the PEM.

* * * * *